United States Patent [19]
Smolarek et al.

[11] Patent Number: 6,143,056
[45] Date of Patent: Nov. 7, 2000

[54] ROTARY VALVE FOR TWO BED VACUUM PRESSURE SWING ABSORPTION SYSTEM

[75] Inventors: James Smolarek, Boston; Leslie Charles Kun, Williamsville, both of N.Y.

[73] Assignee: Praxair Technology, Inc., Danbury, Conn.

[21] Appl. No.: 09/195,412

[22] Filed: Nov. 19, 1998

[51] Int. Cl.[7] .............................................. B01D 53/047
[52] U.S. Cl. .................. 95/96; 95/102; 95/130; 96/124; 96/130; 96/144
[58] Field of Search .................. 95/96–98, 100–105, 95/130; 96/124, 130, 144

[56] References Cited

U.S. PATENT DOCUMENTS

| | | |
|---|---|---|
| 848,536 | 3/1907 | Cosper . |
| 2,312,941 | 3/1943 | Tucker ........................................ 251/98 |
| 2,332,882 | 10/1943 | Abbatiello ............................ 137/625.47 |
| 2,751,032 | 6/1956 | Ringo et al. ................................ 96/124 |
| 3,329,166 | 7/1967 | Kiernan ................................ 137/625.16 |
| 3,334,658 | 8/1967 | Kaatz .................................... 137/630.16 |
| 3,489,178 | 1/1970 | Kice ...................................... 137/625.41 |
| 3,889,712 | 6/1975 | Fields .................................... 137/625.47 |
| 4,038,054 | 7/1977 | Gräff ......................................... 96/124 |
| 4,272,265 | 6/1981 | Snyder ................................... 96/124 X |
| 4,312,372 | 1/1982 | Amos et al. ........................ 137/625.47 |
| 4,469,494 | 9/1984 | van Weenen ............................... 96/124 |
| 4,925,464 | 5/1990 | Rabenau et al. ............................ 96/124 |
| 4,979,756 | 12/1990 | Krambrock et al. ..................... 251/172 |
| 5,114,440 | 5/1992 | Reiss ............................................ 55/25 |
| 5,114,441 | 5/1992 | Kanner et al. ............................... 55/26 |
| 5,122,164 | 6/1992 | Hirooka et al. .............................. 55/26 |
| 5,223,004 | 6/1993 | Eteve et al. .................................. 55/26 |
| 5,256,174 | 10/1993 | Kai et al. ............................... 96/124 X |
| 5,429,666 | 7/1995 | Agrawal et al. ........................... 95/101 |
| 5,549,733 | 8/1996 | Marot et al. ............................... 95/100 |
| 5,584,322 | 12/1996 | Pöschl et al. .......................... 96/124 X |
| 5,593,480 | 1/1997 | Pöschl ....................................... 96/124 |
| 5,632,804 | 5/1997 | Schartz ................................. 96/130 X |
| 5,807,423 | 9/1998 | Lemcoff et al. ....................... 96/124 X |
| 5,814,130 | 9/1998 | Lemcoff et al. ....................... 96/124 X |
| 5,814,131 | 9/1998 | Lemcoff et al. ....................... 96/124 X |
| 5,820,656 | 10/1998 | Lemcoff et al. ....................... 96/124 X |
| 5,906,224 | 5/1999 | Tupper et al. ...................... 137/625.47 |

FOREIGN PATENT DOCUMENTS

| | | | |
|---|---|---|---|
| 2033777 | 5/1980 | United Kingdom ..................... 96/124 |

*Primary Examiner*—Robert H. Spitzer
*Attorney, Agent, or Firm*—Robert J. Follett

[57] ABSTRACT

A dual-chambered, four-ported rotary valve with a rotatable drum having peripheral openings is used to selectively connect vacuum and/or air sources and a vent to absorption chambers in a two-bed VPSA (vacuum presssure swing absorption) system to replace separate valves and produce low cost enriched oxygen, via reduced power, increased reliability, and reduced complexity and cost.

15 Claims, 8 Drawing Sheets

| Feed Side | Steps per Table II |
|---|---|
| Feed Bed A<br><br>FIG.8A | 1-3 :Raising pressure feed<br>4:Constant pressure feed |
| <br>FIG.8B | 5:Falling pressure equalization |
| Feed Bed. B<br><br>FIG.8C | 6,7;Falling pressure evacuation<br>Constant pressure evacuation |
| <br>FIG.8D | 9;Raising pressure evacuation |

| Vacuum Side | Steps per Table II |
|---|---|
| Vacuum B  FIG.8E | 1-3 :Raising pressure feed<br>4:Constant pressure feed |
| Vacuum B  FIG.8F | 5:Falling pressure equalization |
| Vacuum A  FIG.8G | 6,7;Falling pressure evacuation<br>Constant pressure evacuation |
| Vent (unloaded)  FIG.8H | 9;Raising pressure evacuation |

ROTARY VALVE FOR TWO BED VACUUM PRESSURE SWING ABSORPTION SYSTEM

BACKGROUND OF THE INVENTION

1. Field of the Invention

The present invention relates to vacuum pressure swing absorption systems for selectively absorbing nitrogen from air to produce an oxygen-enriched gas stream and, in particular, to an apparatus and method for operating such a system using a multiport valve.

2. Description of Related Art

The separation of air by a vacuum pressure swing absorption (VPSA) system to produce oxygen or nitrogen has become economically attractive recently. The cycles employed by this type of system generally have relatively short times. Improvements in the VPSA system have involved the reduction of the time for each of the steps. This reduction in time has made the operation of process valves quite critical in the successful operation of new cycles. The time required to open and close the process valves has been found to be an important factor. Automatic valves currently available for this type of service are limited in their ability to respond to cycle requirements.

Numerous VPSA systems are in use today. These systems generally employ a multiplicity of separate double-ported valves to direct the flow of fluids in accordance with the specific cycle. These valves are interconnected by a complex and expensive piping system. As a result, the associated capital cost of these VPSA systems is high, and system optimization is limited by the physical characteristics of the valves, resulting in high operating costs.

For example, U.S. Pat. No. 5,549,733 discloses a vacuum-type cycle used for the production of oxygen from air in which the equipment includes six individual automatic valves to control the cycle. In another case, U.S. Pat. No. 5,223,004, a method of absorption separation of gases of the kind which regenerates the absorbent by pressure variation and uses two absorbers also incorporates at least six automatic valves to control the flow, pressures and timing of the cycle. A process for oxygen enrichment of air by means of a vacuum swing absorption system in a three-bed process disclosed in U.S. Pat. No. 5,144,440 uses a number of individual automatic valves. A valve assembly having two valve members which use rotating plugs for directing flow is disclosed in U.S. Pat. No. 5,114,441 for an oxygen concentrator system. A two-bed pressure swing process disclosed in U.S. Pat. No. 5,122,164 uses six automatic valves for controlling the cycle along with two automatic valves for equalization steps. Thus it would be desirable to eliminate all or most of the valve skid bottom piping and switching valves associated with the feed and vacuum systems in a VPSA system.

Bearing in mind the problems and deficiencies of the prior art, it is therefore an object of the present invention to provide a system for selectively removing a desired component, for example nitrogen, from a fluid such as air which utilizes fewer valves.

It is another object of the present invention to provide such a system which further eliminates excess piping connecting the system components.

A further object of the invention is to provide a VPSA system with improved cycle times and efficiencies.

It is yet another object of the present invention to provide a VPSA system which uses less power.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, an apparatus for separating components from a fluid mixture comprising a source of fluid at a first pressure, a source of fluid at a second pressure different from the first pressure and at least one chamber containing an absorbent for selectively absorbing a component from the fluid. The apparatus further includes a valve operatively connected to the first pressure fluid by a first flow passage and to the second pressure fluid by a second flow passage. The valve is also connected to the chamber by a first flow port, and to a vent by a second flow port. The valve has a plurality of positions simultaneously interconnecting the first and second flow passage to selected flow ports. The valve in a first position is adapted to connect the first or second flow passage and the first flow port to provide a flow between the first or second pressure fluids and the chamber. The valve in a second position is adapted to connect the first or second flow passages and the second flow port to provide a flow between the first or second pressure fluids and the vent.

In another aspect, the present invention provides an apparatus for separating components from a fluid mixture comprising a source of feed fluid, a source of vacuum and first and second chambers, each chamber containing an absorbent for selectively absorbing a component from the fluid. Preferably, the source of feed fluid comprises a source of feed air, and the chambers contain a bed of the absorbent for selectively absorbing nitrogen from air. The apparatus also includes a valve operatively connected to the source of feed fluid or the source of vacuum by a first flow passage, to the first chamber by a first flow port, and to the second chamber by a second flow port. The valve has a plurality of positions simultaneously interconnecting the first flow passage to a selected flow port. The valve in a first position is adapted to connect the first flow passage and the first flow port to provide a flow passage between the source of fluid or the source of vacuum and the first chamber. The valve in a second position is adapted to connect the first flow passage and the second flow port to provide a flow passage between the source of fluid or the source of vacuum and the second chamber.

Preferably, the valve has two valve portions. A first valve portion is operatively connected to the source of feed fluid and a second valve portion is operatively connected to the source of vacuum. In the first position the valve simultaneously connects the source of fluid to the first chamber and the source of vacuum to the second chamber. In the second position the valve simultaneously connects the source of fluid to the second chamber and the source of vacuum to the first chamber. The valve may further include a third flow port connected to a vent to atmosphere.

In yet another aspect, the present invention provides an apparatus for separating components from a fluid mixture comprising a source of feed fluid, a source of vacuum and first and second chambers, each chamber containing an absorbent for selectively absorbing a component from the fluid. The apparatus also includes a valve having first and second portions. The first valve portion is operatively connected to the source of feed fluid by a first flow passage, to the first chamber by a first flow port, to the second chamber by a second flow port, and to a vent to atmosphere by a third flow port. The second valve portion is operatively connected to the source of vacuum by a second flow passage, to the first chamber by a fourth flow port, to the second chamber by a fifth flow port, and to a vent to atmosphere by a sixth flow port. The valve has a plurality of positions interconnecting the flow passages with the flow ports. The valve in a first position is adapted to connect the first flow passage with the first flow port and the second flow passage with the fifth flow port. The valve in a second position is adapted to connect the first flow passage with the third flow port and the second flow passage with the fourth flow port. The valve in a third position is adapted to connect the first flow passage with the second flow port and the second flow passage with the fourth flow port. The valve in a fourth position is adapted to connect the first flow passage with the third flow port and the second flow passage with the fourth flow port.

In preferred embodiment, the valve has a housing and the flow ports are disposed on outer peripheral walls of the housing. The valve may further include a rotary drum adapted to connect the flow passages to the flow ports, wherein the first and second valve portions are longitudinally spaced along an axis of the drum. The drum may be divided between two chambers in the valve, with one of the chambers corresponding to the first valve portion, and the other of the chambers corresponding to the second valve portion. Each of the chambers may be independently positionable from the other. The valve may include separate drum portions in the chambers rotatable about a longitudinal axis.

In the preferred rotary valve, the flow ports are disposed on an outer peripheral wall thereof. The valve may also include an internal plug member rotatable to move between the positions and containing openings to connect the flow passages to the flow ports. The valve may further include a movable seal between the housing and the internal plug member which is retractable to permit freer movement of the plug between the positions.

In a related aspect, the present invention provides a method for separating components from a fluid mixture. There is first provided a source of fluid at a first pressure, a source of fluid at a second pressure different from the first pressure, and a chamber adapted to selectively remove a component from the fluid. There is also provided a valve operatively connected to the first pressure fluid by a first flow passage and to the second pressure fluid by a second flow passage, to the chamber by a first flow port, and to a vent by a second flow port. The valve has a plurality of positions simultaneously interconnecting the first and second flow passage to selected flow ports. The method then includes moving the valve to a first position to connect the first or second flow passage and the first flow port to provide a flow between the first or second pressure fluids and the chamber. The method further includes moving the valve to a second position to connect the first or second flow passages and the second flow port to provide a flow between the first or second pressure fluids and the vent.

In another related aspect, the present invention provides a method for separating components from a fluid mixture. There is provided a source of feed fluid; a source of vacuum; and first and second chambers, with each chamber adapted to selectively remove a component from the fluid. Preferably, the source of feed fluid comprises a source of feed air, and the chambers contain absorbent for selectively absorbing nitrogen from air. There is also provided a valve operatively connected to the source of feed fluid or the source or vacuum by a first flow passage, to the first chamber by a first flow port, and to the second chamber by a second flow port. The valve has a plurality of positions simultaneously interconnecting the first flow passage with a selected flow port. The method then includes moving the valve to a first position to connect the source of feed fluid to the first chamber and introduce fluid therein, preferably air, to selectively remove a desired component from the fluid, preferably nitrogen, while simultaneously connecting the source of vacuum to the second chamber to evacuate fluid from the second chamber. The valve is then moved to a second position to seal the first chamber while simultaneously connecting the source of vacuum to second chamber to evacuate the second chamber. The valve is thereafter moved to a third position to connect the source of fluid to the second chamber to introduce the feed fluid therein, again preferably air, and selectively remove a desired component from the fluid, again preferably nitrogen, while simultaneously connecting the source of vacuum to the first chamber to evacuate fluid from the first chamber. Finally, the valve is moved to the fourth position to seal the second chamber while simultaneously connecting the source of vacuum to the first chamber to evacuate the first chamber.

In a preferred embodiment, the valve has first and second portions. The first valve portion is operatively connected to the source of feed fluid by a first flow passage, to the first chamber by a first flow port, to the second chamber by a second flow port, and to a vent to atmosphere by a third flow port. The second valve portion is operatively connected to the source of vacuum by a second flow passage, to the first chamber by a fourth flow port, to the second chamber by a fifth flow port, and to a vent to atmosphere by a sixth flow port. The valve has a plurality of positions interconnecting the flow passages with the flow ports. The valve in the first position connects the first flow passage with the first flow port and the second flow passage with the fifth flow port. The valve in the second position connects the first flow passage with the third flow port and the second flow passage with the fourth flow port. The valve in the third position connects the first flow passage with the second flow port and the second flow passage with the fourth flow port. The valve in the fourth position connects the first flow passage with the third flow port and the second flow passage with the fourth flow port. The first and second portions of the valve are moved independently of each other, or may be connected to each other and moved together.

The valve may include a housing and a rotatable internal plug having internal passageways to connect the flow passages to selected flow ports. The method may then further include rotating the drum prior to each of the steps to connect the flow passages to selected flow ports.

More preferably, the valve includes a housing, an internal plug rotatable between the positions to connect the flow passages to selected flow ports, and a movable seal between the housing and the internal plug member. The method then further includes retracting the seal before moving the valve to the positions to permit freer movement of the plug between the positions.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1–8 of the drawings in which like numerals refer to like features of the invention. Features of the invention are not necessarily shown to scale in the drawings.

The present invention employs in its preferred embodiment a multi-chamber, multi-port valve for use in a VPSA system and results in a more economical separation of air. Although the VPSA system illustrated is used to separate nitrogen from air to produce an oxygen-enriched air product, any similar system which preferentially separates a desired component of a fluid may employ the multi-port valve of the present invention. The valve configuration replaces the multiple separate valves used in the prior art and additionally has low pressure drop, fast actuation, low wear, low torque, and low cost with reduced interconnecting piping for economical VPSA application.

Figure 1:
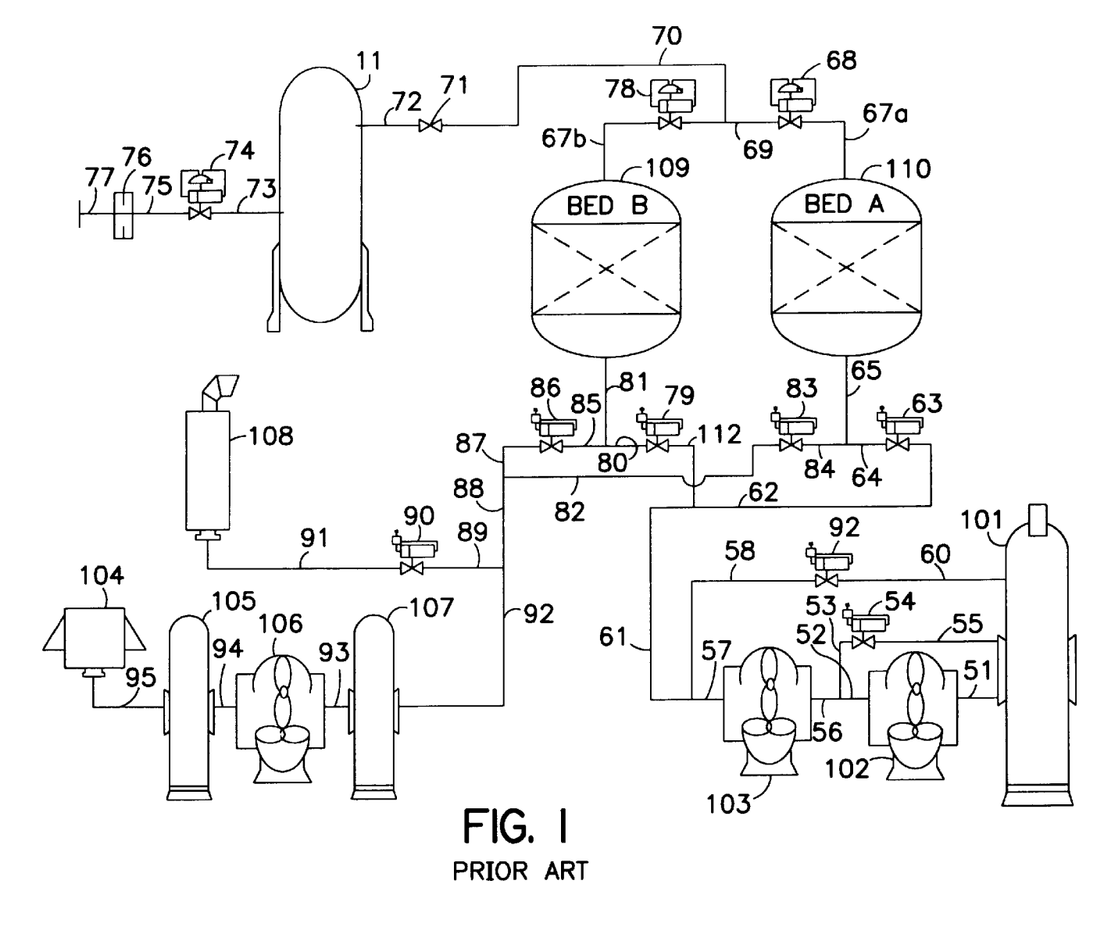
FIG. 1 is a schematic of a prior art VPSA system.

FIG. 1 depicts a conventional prior art VPSA system. The system includes chamber bed A 110 and chamber bed B 109 containing nitrogen absorption material, a vacuum portion including discharge silencer 101, first and second stage vacuum pumps 103 and 102, respectively, to remove waste gas from the system, a feed blower 106, accumulator tank 11 for oxygen enriched product, vent 108 and associated valves and piping connecting the various apparatus. The nitrogen absorption material contained in Beds A and B is preferably calcium, sodium or lithium X or A framework zeolite absorbent. The VPSA system typically produces enriched product comprising about 92 wt. percent oxygen. (Unless otherwise specified, all compositional percentages are by weight.)

Filtered atmospheric air from feed air inlet 104 is drawn through piping 95 and pulsation bottle 105 into lobe-type compressor or feed blower 106 through piping 94. The feed blower discharge is received in piping 93 and through noise silencer 107. Air discharge is through piping 92 and 88 which splits into piping 82 and 87. Feed valves 83 and 86 open as directed by a cycle controller to supply air feed through piping 84 and 85 to bed A 110 or bed B 109, respectively. Since it is advantageous to run feed blower 106 continuously, during the time intervals when feed air is not being supplied to either bed A or bed B, excess feed air is vented to atmosphere from piping 92 through piping 89, opened valve 90, piping 91 and vent silencer 108.

On the vacuum side of the system, air is drawn out from Beds A or B, through piping 64 and 80, respectively by operation of valves 63 and 79, respectively, through piping 62 and 112, respectively, and piping 61 and 57 to vacuum pump first stage 103. Gas discharged through piping 56 and 52 then passes through vacuum pump second stage 102 where it is discharged through silencer 101. Since vacuum pumps 102, 103 are also preferably run continuously, during time intervals when vacuum is not being drawn from beds A and B, excess capacity is recirculated back to pump 103 through piping 60, valve 92 and piping 58. Excess pressure in line 56, which develops at various times of the cycle, is vented via open valve 54 through piping 55 and piping 53.

If bed A 110 is to be pressurized, automatic control valve 83 opens to raise the pressure in bed A. Air is directed through piping 84 and 65 to bed A where the nitrogen absorption takes place. Oxygen-enriched product is collected in product piping 67a, passes through product valve 68 into product piping 70, valve 71 and piping 72 to product accumulator tank 11. Accumulator tank 11 serves to smooth the delivery of the oxygen-enriched product for consumption, and passage through piping 73 to flow control valve 74 regulates the supply of such product for consumption, which is passed through piping 75 and metered through meter 76 before discharge at 77.

During the period that bed A 110 is on the absorption cycle, bed B 109 is on the desorption or regeneration cycle. During this period, bed B 109 first reduces its pressure by equalizing the pressure with bed A 110 by opening valves 68 and 78 and permitting flow through piping 69. After equalizing, valve 78 is closed. The pressure in bed B is then reduced by vacuum pumps 102, 103. The flow to and through the vacuum pumps is by way of piping 81, valve 79, piping 112, piping 62, piping 61 and 57, vacuum pump 103, piping 56, vacuum pump 102, piping 51 and silencer 101.

When bed B 109 is completed with the regeneration cycle, it then receives feed air through piping 88 and 87, valve 86, piping 85 and through piping 81 and discharges oxygen-enriched air through piping 67b and valve 78, connected to piping 70. When bed A 110 is placed on the desorption or regeneration cycle it is evacuated in a manner similar to that described for bed B through piping 65, valve 63 and piping 62.

In accordance with the present invention, a multi-port valve has been developed which combines the function of all six of the double-ported valves used in the prior art into a single multi-ported valve. As a result, the complex piping is significantly reduced, and the use of the many double-ported valves eliminated. The fast acting operation of the valve reduces the cycle time, which, because of the relatively short cycle times for VPSA plants, becomes a significant factor in the overall performance. Also the fast action of the valve permits a more effective utilization of the absorbent in the bed by reducing mixing losses due to a more accurate cut-off of the flow. Thus, for the same bed depth more productivity is possible and a shorter bed depth with shorter cycle times may be employed for the same production. A reduction in the unit capital cost of the facility is consequently obtained. The present invention also enables the development of a more optimized VPSA cycle and further reduce operating costs. The optimized, lower pressure drops in the valve of the present invention, along with the simplified interconnecting piping, adds to the advantages of the present invention.

Figure 4A:
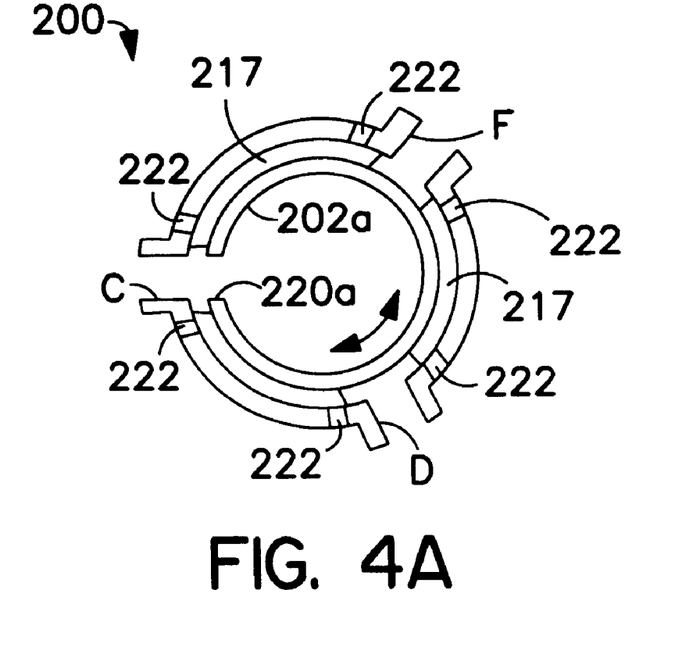
FIG. 4a is a sectional view showing the rotary valve in the first chamber (air feed side) along lines 4a—4a of FIG. 3.
Figure 4B:
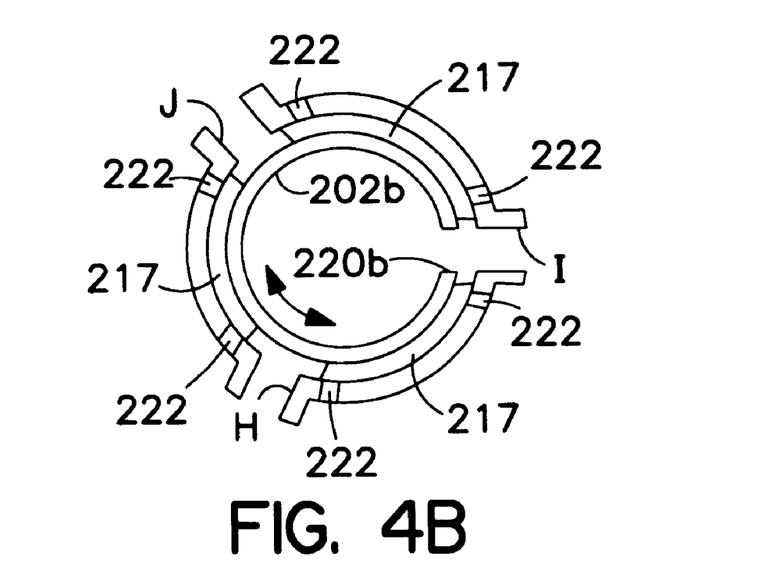
FIG. 4b is a sectional view showing the rotary valve in the second chamber (vacuum side) along lines 4b—4b of FIG. 3.
Figure 5:
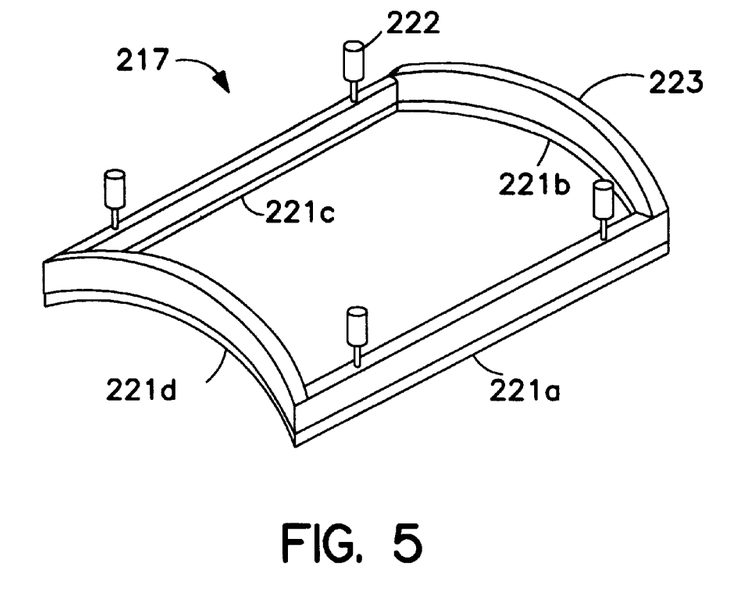
FIG. 5 is a perspective view of the valve seal used in the valve of FIG. 2.
Figure 6:
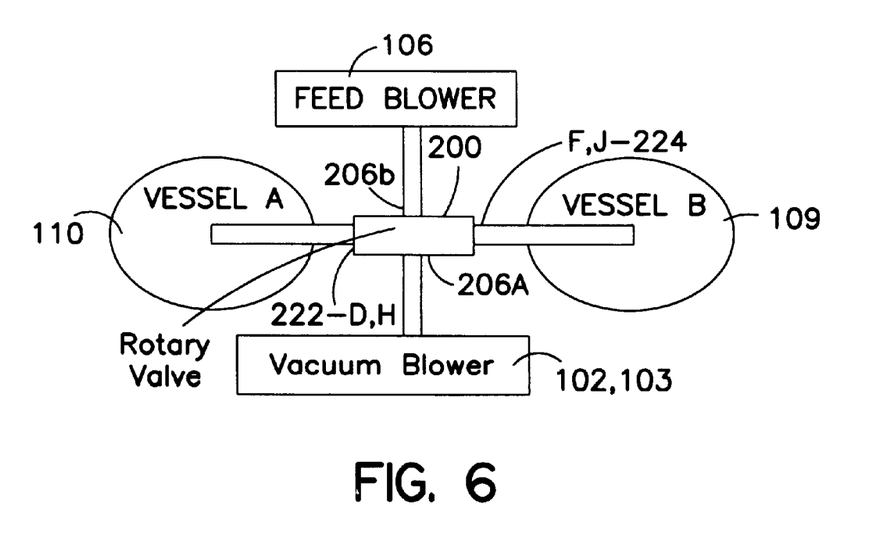
FIG. 6 is a schematic of the connection of the multi-port rotary valve of the present invention in a VPSA system.
Figure 7:
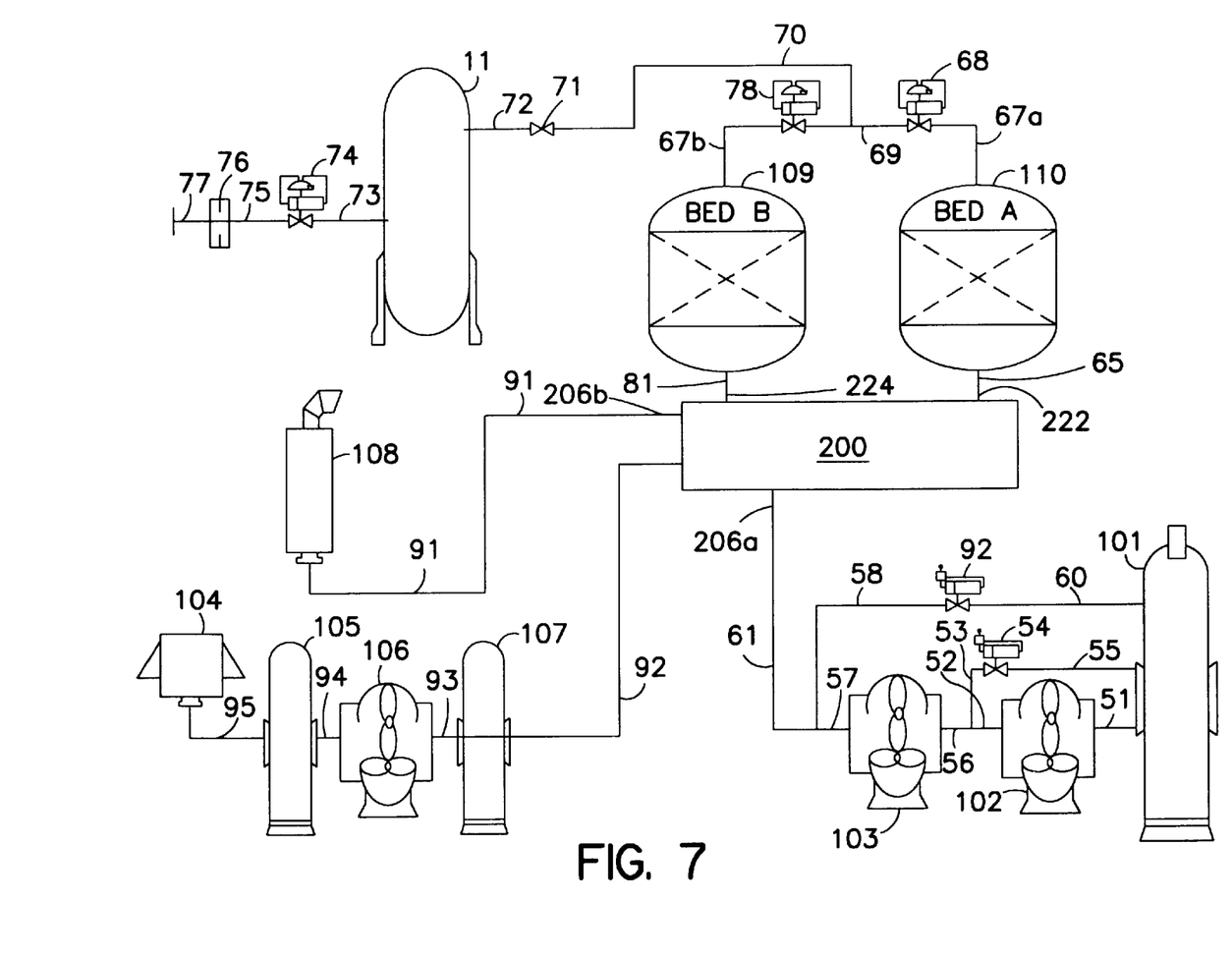
FIG. 7 is a schematic of the preferred VPSA system incorporating the multi-port rotary valve of the present invention.

The preferred valve of the present invention combines the function of all six automatic valves shown in FIG. 1, i.e., valves 63, 79, 83, 86, 90 and 92. The preferred double chamber, multi-ported rotary valve of the present invention is depicted in FIGS. 2–5 and 8. The incorporation of the rotary valve in a VPSA system is shown in FIGS. 6 and 7. Rotary valve 200 contains two independent sets of three ports positioned 120 degrees apart, each set having a common inlet/outlet. Valve hollow cylindrical drum-shaped body 201 houses internal corresponding drum-shaped cylindrical plugs 202a and 202b, which are disposed in first and second separate chambers, respectively, and are independently rotatable about central shaft 203. As will be described in more detail below, the feed and vacuum sides of the valve are blocked at the center and operate independently of each other. The valve outer body is cylindrical and contains a plurality of flow ports along its outer periphery for operative connection to the other VPSA system components. A cross section of the rotary valve is shown in FIG. 4a which illustrates the position of ports C, D and F and in FIG. 4b which illustrates the position of ports H, I, and J. In each portion or chamber of the rotary valve, the ports are angularly spaced about 120° apart around the outer periphery of the valve housing. Ports D and H are connected to each other externally by manifold 222, which connect to bed A 110. Ports F and J are connected to each other externally by manifold 224, which connect to bed B 109. Ports C and I are connected to system vents 108 and 101, respectively.

Figure 2:
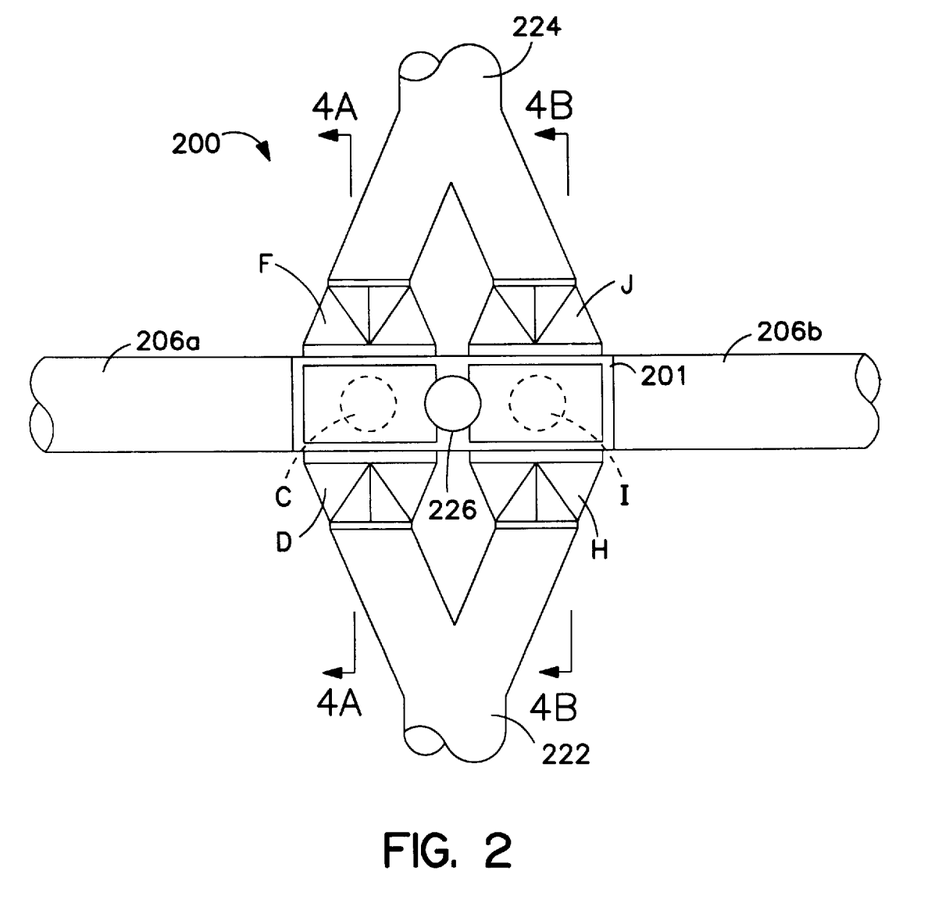
FIG. 2 is a plan view of the preferred double chamber, multi-port rotary valve of the present invention for use with a VPSA system.
Figure 3:
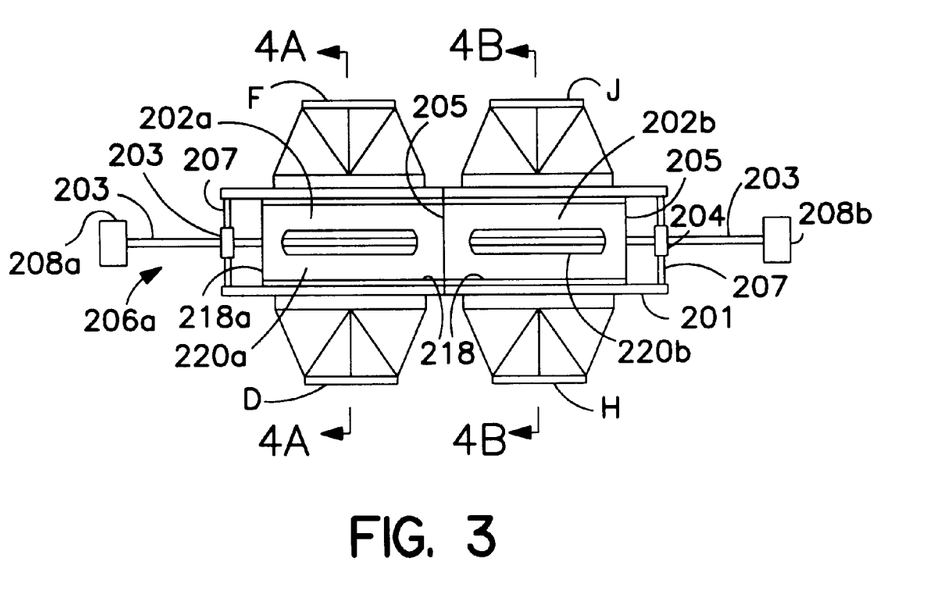
FIG. 3 is a plan view of the double chamber, multi-port rotary valve of FIG. 2 with the conduit coverings removed, showing the internal valve components.

As shown in more detail in FIG. 2 and the mechanical schematic of FIG. 3, rotary valve 200 has two inlet/outlet passages 206a and 206b at opposite ends of the valve body. Although the inlet/outlet passages are interchangeable, passage 206a is connected to the source of vacuum while passage 206b is connected to the source of atmospheric feed air. Discharge ports C, D and F are available for connection to vacuum inlet 206a while discharge ports H, I and J are available for connection to feed air inlet 206b. The body 201 of the valve 200 contains rotating plugs 202a and 202b. The plugs and valve are divided into two chambers by partition 205 to permit the processing of two separate streams with indexing of plugs 202a and 202b independently of one another. As shown in FIGS. 4a and 4b, the rotation of the plugs may be counter-clockwise or clockwise. Plug 202a has an opening 218a at its end facing vacuum inlet 206a and, in internal communication therewith, an opening 220a on its outer periphery. Similarly, plug 202b has an opening 218b at its end facing feed air inlet 206b and, in internal communication therewith, an opening 220b on its outer periphery. Upon rotation of plugs 202a, 202b, the outer openings 220a, 220b may be indexed into alignment with a desired port for flow of vacuum and/or feed air to the system component in communication with the port.

Plugs 202a and 202b are preferably relatively thin-walled drums to provide a relatively low mass to permit operation at high speed. Plugs 202a and 202b are supported centrally at each end by struts 207, which contain bearings 204 upon which shaft 203 rotates. Servo motors or other drive-type motors 208a and 208b, driving through gear boxes provide the motive power to rotate and position plugs 202a and 202b, respectively. Seals 217 around each opening in plugs 202a and 202b, provide leak-tight operation. As shown in FIGS. 4a, 4b and 5, there are three seal assemblies 217 disposed around the inside of valve housing 201 between the ports to seal off the plug openings when the plug openings are not aligned with the valve discharge ports.

Although the low mass of the plugs makes possible high speed operation, which is very desirable for use in VPSA service, along with low mass of the thin-walled plugs there comes the possibility of distortion. Seal 217 is configured to reduce or eliminate the distortion problem. As shown in FIG. 5, a relatively stiff frame 223 is provided with a relatively stiff seal comprising sections 221a–d. The seal sections are preferably made of abrasive-resistant, pliable materials such as rubber or TEFLON® fluoropolymer. Longitudinal seal sections 221a and 221c are straight and aligned parallel to the longitudinal axis of the drum. Circumferential seal sections 221b and 221d are aligned circumferentially around the drum and curved to conform to the curvature of the drum. This seal assembly 217 is placed between the valve ports along the inside cylindrical walls of valve body 201. Pneumatic cylinder actuators 232 secured to the valve body 201 operate to retract the seal assembly away from tight contact with the drum before rotation of the valve drum begins and extend the seal assembly into tight contact with the drum after the rotation stops. In this manner not only is positive seal provided with enough flexibility to follow the distortion of the drum, but the substantial wear of the seal is also prevented by eliminating the sliding wear between the seal 221 and valve drums 206a and 206b. Action of the plug is accelerated because there is no friction between the valve body and plug to hinder movement of the plug. This configuration also minimizes seal perimeter, thus the potential for leakage through the seal.

The preferred multi-port rotary valve of the present invention is described in more detail in U.S. application Ser. No. 09/195,411 (attorney docket no. D-20410) entitled ROTARY VALVE, filed on even date herewith. The rotating valve assembly 200 shown in FIGS. 2–5 is adapted to accomplish the task of prior art systems which employ two feed valves, two vacuum valves and two unload vents. In the schematic shown in FIG. 6, multi-port rotary valve 200 may be integrated into the prior art VPSA system. Rotary valve passage 206a is connected to vacuum blowers 102, 103 and passage 206b is connected to feed blower 106. Ports D and H are connected through manifold 222 to vessel A 110, and ports F and J are connected through manifold 224 to vessel B 109. Ports C and I are connected to the atmospheric vents.

The incorporation of the rotary valve of the present invention into the entire preferred VPSA system is shown in FIG. 7. All system components are the same as shown in FIG. 2, except for the connections to rotary valve 200. Air feed line 92 is connected to rotary valve feed passage 206b. Feed air may then be delivered to bed A 110 by rotation of plug 202b to connect to port H. The feed air is then passed through manifold 222 to bed A through piping 65 in order to remove nitrogen. Feed air may alternately be delivered to bed B 109 by rotation of plug 202b to connect to port J and manifold 224, after which the feed air is passed to bed B through piping 81 for nitrogen removal. Since it is advantageous to run feed blower 106 continuously, during the time intervals when feed air is not being supplied to either bed A or bed B, excess feed air is vented to atmosphere from through manifold 226 (See also FIG. 2), piping 91 and vent silencer 108.

Vacuum purge of bed B occurs when vacuum exhaust is drawn through manifold 224, valve port F (in registration with plug 202a) and vacuum inlet/outlet 206a and through piping 61 to vacuum blowers 102, 103 as before. When this first half of the cycle is completed, the cycle continues with the absorption taking place in bed B and the regeneration taking place in bed A in a similar manner as just described, with vacuum exhaust is drawn through manifold 222, valve port D (now in registration with plug 202a) and vacuum inlet/outlet 206a and through piping 61 to vacuum blowers 102, 103.

The required porting sequence during operation of the VPSA cycle is achieved through the independent rotation of the drum in the two chambers. FIGS. 8a–8h show each of the valve rotation sequences and preferred porting arrangements. The valve internal drums or plugs rotate in either direction to one of the three positions, connecting the feed and vacuum pumps independently to either bed or a vent position. This allows for a vent step, if desired, between each bed pressurization period. The vent position is also used for startup, blocking off both beds, and venting the blowers. The vacuum end under normal operation rotates from port D connecting to bed A to port F connecting to bed B without stopping at the vent position (port C). The valve will stop at the vent port position for unload as required, blocking off both beds and venting the blower. This vent unload feature requires that the valve be capable of indexing at any time to the vent position as directed by the control system.

The required porting sequence is achieved through the use of the two chambers rotating independently. These chambers preferably reverse direction of rotation in the course of operation to achieve the required cycle sequence. The valve rotation and porting arrangement for the preferred VPSA cycle is described as follows in Table 1, with the appropriate figure shown for the feed valve and vacuum valve. The approximate time and pressure ranges for each step are shown in parentheses, along with the preferred time and pressure. Unless otherwise stated, all pressures are psia.

TABLE 1

| Step Description | Duration (sec.) | Pressure (psia) at Start of Step | Pressure (psia) at End of Step | Feed Valve Port Open | Vacuum Valve Port Open |
|---|---|---|---|---|---|
| 1. Raising pressure feed with overlap equalization | (1–3) 2 | (5–15) 5 | (10–18) 13 | Bed A (FIG. 8a) | Bed B |
| 2. Raising pressure feed with overlap product pressurization | (1–4) 3 | (10–18) 13 | (15–20) 17 | Bed A (FIG. 8a) | Bed B |
| 3. Raising pressure feed | (2–10) 7 | (15–20) 17 | (17–24) 22 | Bed A (FIG. 8a) | Bed B (FIG. 8e) |
| 4. Constant pressure feed with product make | (2–10) 10 | (17–24) 22 | (17–25) 22 | Bed A (FIG. 8a) | Bed B (FIG. 8e) |
| 5. Falling pressure equalization | (1–2) 2 | (17–25) 22 | (14–21) 19 | Vent (FIG. 8b) | Bed B (FIG. 8f) |
| 6. Falling pressure evacuation with overlap equalization | (1–2) 2 | (14–21) 19 | (10–16) 15 | Bed B (FIG. 8c) | Bed A (FIG. 8g) |
| 7. Falling pressure evacuation | (3–20) 17 | (10–16) 15 | (4–15) 4 | Bed B (FIG. 8c) | Bed A (FIG. 8g) |
| 8. Constant pressure evacuation with oxygen purge | (1–5) 3 | (4–15) 4 | (4–15) 4 | Bed B (FIG. 8c) | Bed A (FIG. 8g) |
| 9. Raising pressure evacuation with overlap equalization | (1–4) 2 | (4–15) 4 | (5–15) 5 | Vent (FIG. 8d) | Bed A (FIG. 8h) |

FIGS. 8a–8d are taken along lines 4b—4b and FIGS. 8e–8h are taken along lines 4a—4a of FIGS. 2 and 3. In the first valve position illustrated by FIGS. 8a and 8e, the drums are rotated in the direction shown so that the opening 220b in drum 202b is in registration with port H, thus permitting feed air flow to bed A 110, and the opening 220a in drum 202a is in registration with port F, thus permitting vacuum evacuation of bed B 109. In each of the drum chambers, connection of the respective feed and vacuum is blocked from the other ports. Steps 1–4 of Table 1 take place with the drum in the first position. During step 1, overhead valves 68 and 78 are open, Feed air is pumped into the lower portion of bed A while pressurized oxygen-enriched air from bed B travels to bed A. In step 2, valve 78 is closed and bed B is evacuated by vacuum pumps 102, 103. Valve 68 remains open and bed A is fed oxygen-enriched air from tank 11 to the top of the chamber while still being fed air from the bottom through rotary valve 200. In bed B, valve 78 is closed and the evacuation of the chamber continues. In step 3, valve 68 is closed and bed A continues to receive feed air through rotary valve 200. Bed B continues evacuation as in step 2. In step 4, valve 68 is opened while still receiving feed air through rotary valve 200, and oxygen-enriched air continuously flows to product tank 11 as the nitrogen is absorbed.

Figure 8A:
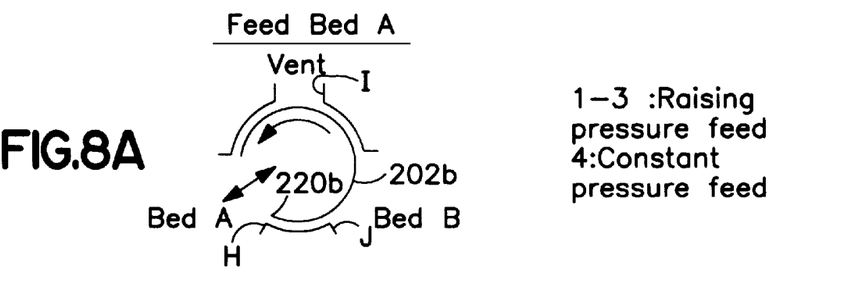
FIGS. 8a–8d are views, similar to that shown in FIG. 4a, of the position of the air feed side rotary valve first chamber during operation of the preferred VPSA cycle steps.
Figure 8B:
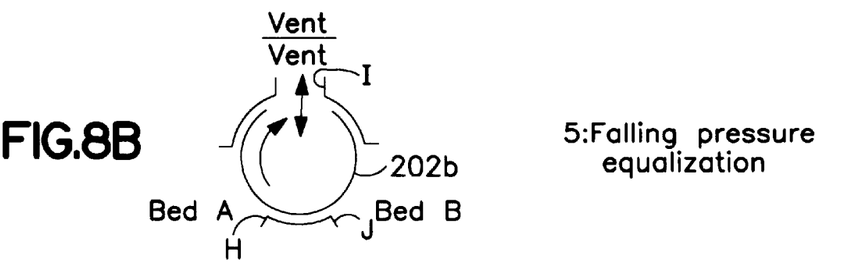
Figure 8C:
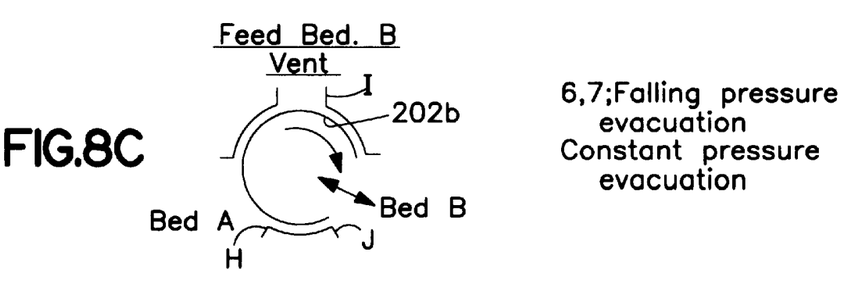
Figure 8D:
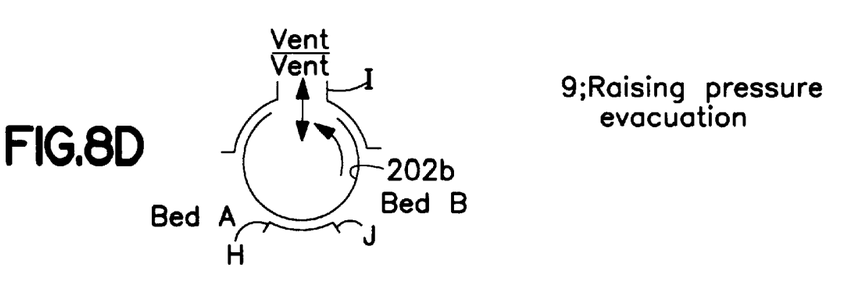
Figure 8E:
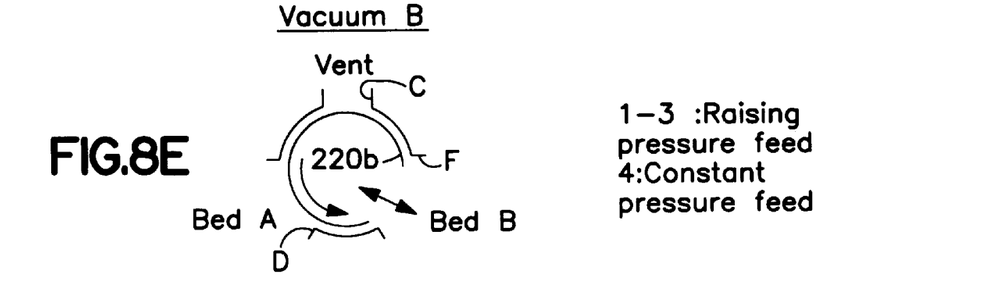
FIGS. 8e–8h are views, similar to that shown in FIG. 4b, of the position of the vacuum side rotary valve second chamber during operation of the preferred VPSA cycle steps.
Figure 8F:
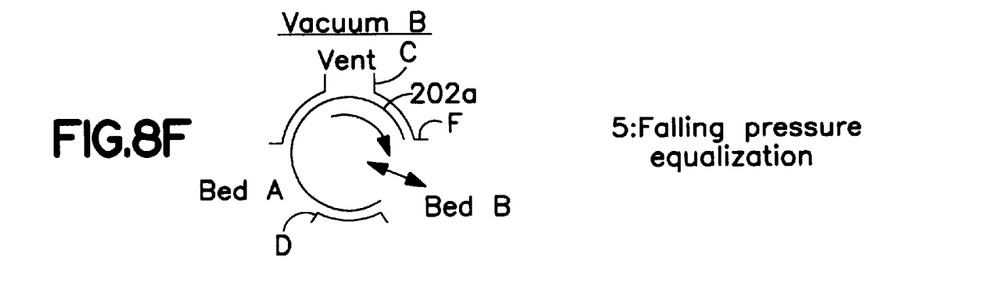

In the second valve position illustrated by FIGS. 8b and 8f, the drums are rotated in the direction shown so that the opening 220b in drum 202b is in registration with port I, thus permitting feed air flow to the vent, if desired, and the opening 220a in drum 202a is in registration with port F, thus permitting vacuum evacuation of bed B 109. Again, in each of the drum chambers, connection of the respective feed and vacuum is blocked from the other ports. Step 5 of Table 1 takes place with the drum in the second position. In step 5, production of oxygen-enriched product in bed A ceases as the bottom is shut off by rotary valve 200. Top valves 68 and 78 are opened and pressure and residual oxygen-enriched air travels to bed B. No feed air is pumped to either chamber.

Figure 8G:
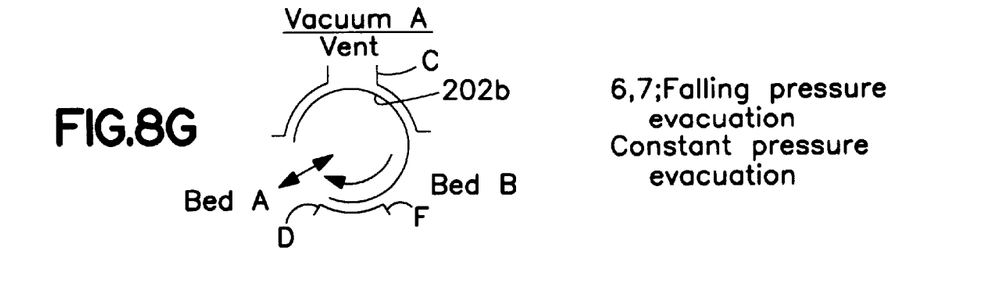

In the third valve position illustrated by FIGS. 8c and 8g, the drums are rotated in the direction shown so that the opening 220b in drum 202b is in registration with port J, thus permitting feed air flow to bed B 109, and the opening 220a in drum 202a is in registration with port D, thus permitting vacuum evacuation of bed A 110. As before, in each of the drum chambers, connection of the respective feed and vacuum is blocked from the other ports. Steps 6–8 of Table 1 take place with the drum in the third position. In step 6, valves 68 and 78 are opened. Bed A continues to transfer oxygen-enriched product and pressure to bed B. At the same time, bed A is connected at the bottom through rotary valve 200 to vacuum pumps 102, 103 as residual nitrogen is purged from the chamber. In bed B, feed air begins to be introduced through rotary valve 200. In step 7, top valve 68 is closed and bed A continues to be evacuated through rotary valve 200. In bed B, feed air continues to be introduced through rotary valve 200 as valve 78 is closed and pressure rises. In step 8, top valve 68 is opened and bed A is further purged of nitrogen by simultaneous flow of oxygen-enriched air from tank 11 through the top and evacuation through rotary valve 200 through the bottom. In bed B, feed air continues to be introduced through rotary valve 200 as valve 78 is open and oxygen-enriched air is produced.

Figure 8H:
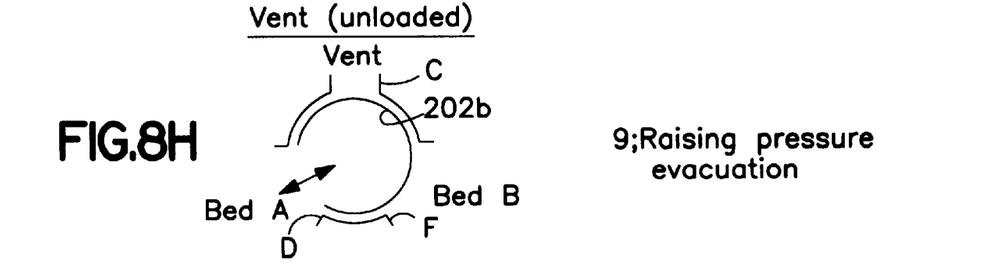

Finally, in the fourth valve position illustrated by FIGS. 8d and 8h, the drums are rotated in the direction shown so that the opening 220b in drum 202b is in registration with port H, thus permitting feed air flow to vent if desired, and the opening 220a in drum 202a is in registration with port D, thus permitting vacuum evacuation of bed A 110. Again, in each of the drum chambers, connection of the respective feed and vacuum is blocked from the other ports. Step 9 of Table 1 takes place with the drum in the fourth position. In step 9, valves 68 and 78 are opened and bed A continues to evacuate from the bottom while bringing in pressurized oxygen-enriched air from bed B. No feed air is pumped to either chamber.

The following Table 2 indicates the differences and improvements in a VPSA process using the multi-port rotary valve of the present invention rotary valve rather than the prior art's two-ported valves.

TABLE 2

| Advantage of 4-way valve | Conventional 2 way Valves | Rotary 4-way valves |
| --- | --- | --- |
| Switching Time | 0.5–1.0 sec. | 0.25–0.5 sec. |
| Less mixing losses improvement recovery | Base case | 1–2% process in oxygen |
| Piping | — | Simplified |
| Plot size | — | Smaller |
| Cost | — | Lower |
| Less Void Losses improvement recovery | Base case | 1% process in oxygen |
| Reduced pressure drop power | Base case | 1–2% reduction in |
| Improved reliability at large plant | 2% downtime | 1.5–2.0% downtime |
| Increased plant size | Limited | Scale to very large sizes |

Pressure drop in a VPSA system carries a heavy economic value. As can be seen, the complexity of the interconnecting piping is significantly reduced in the present invention. This, along with the light weight scale-up capability of the rotary valve allows for reduction of pressure drop through the valve.

Additionally, the configuration and features of the rotary valve permits severe repetitive service. Good wear characteristics are extremely important. The low mass plug design along with the non-scuff feature permits rapid valve action, very short cycle time and low maintenance, resulting in cost savings associated with bed size reduction. High frequency of operation and positive positioning of the rotary valve permit essentially no scuffing, sliding or bearing against the valve body.

Cost studies have indicated a saving of about 40 percent in the cost of a valve skid of a VPSA unit. A reduction in power consumption may also be expected with the rotary valve. It is estimated that a saving of 0.1 to 0.2 kw/TPD are possible as the result of reduced pressure drop and void volume with the simplified piping. An additional saving of 0.1 to 0.2 kw/TPD is also expected because of reductions in the instrument air requirement.

As can be seen from the above example, the operation of the cycle is dependent upon fast operation of the valve. The present invention is not restricted to the VPSA application described above. The number of ports in the design is limited only by the size of the ports and the physical space on the outer periphery of the body of the valve. Thus three, four or more ports may be incorporated into the design of each chamber of the valve. The ports may be provided with a manifold external to the valve in any manner desired. In addition to containing any number of corresponding ports, the plug can be partitioned into two or more separate chambers by the addition of a solid membrane in the center of the plug. With this design, both chambers of the plug would function in unison. However, the plug can also be designed as two separate sections allowing each section to be operated independently. The rotation of the plug, either the single-acting plug or the two section independently acting plugs, can be controlled to rotate either clockwise or counterclockwise in any sequence required by the cycle. The control of the plug may be through an electrical motor and gear set, pneumatic or hydraulic. The operation of the plug may be computer programmed to function in any desired sequence. All of the forgoing features permits the application of this valve to a limitless number of VPSA cycle variations.

Additionally, the system and method using the rotary valve of the present invention may be adapted to other systems utilizing chambers which must be subjected to different pressures. Instead of having the valve connect to a vacuum pump at one flow passage and a feed air blower at the other flow passage, both flow passages may be connected to feed air blowers at different pressures above atmospheric. Alternatively, both valve flow passages may be connected to separate vacuum pumps at different pressures below atmospheric. The system and method may also be utilized with one chamber instead of the two shown for illustration.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method for separating components from a fluid mixture comprising the steps of:
    a) providing a source of feed fluid; a source of vacuum; and first and second chambers, each chamber adapted to selectively remove a component from said fluid; and
    b) providing a valve operatively connected to said source of feed fluid or said source or vacuum by a first flow passage, to said first chamber by a first flow port, and to said second chamber by a second flow port, said valve having a plurality of positions simultaneously interconnecting said first flow passage with a selected flow port;
    c) moving said valve to a first position to connect said source of feed fluid to said first chamber and introduce fluid therein to selectively remove a desired component from said fluid while simultaneously connecting said source of vacuum to said second chamber to evacuate fluid from said second chamber;
    d) moving said valve to a second position to seal said first chamber while simultaneously connecting said source of vacuum to second chamber to evacuate said second chamber;
    e) moving said valve to a third position to connect said source of fluid to said second chamber to introduce said feed fluid therein and selectively remove a desired component from said fluid while simultaneously connecting said source of vacuum to said first chamber to evacuate fluid from said first chamber; and
    f) moving said valve to said fourth position to seal said second chamber while simultaneously connecting said source of vacuum to said first chamber to evacuate said first chamber, wherein said valve has first and second independently positionable portions, the first valve portion being operatively connected to said source of feed fluid by a first flow passage, to said first chamber by a first flow port, to said second chamber by a second flow port.

2. The method of claim 1 wherein said first valve portion is operatively connected to a vent to atmosphere by a third flow port, the second valve portion being operatively connected to said source of vacuum by a second flow passage, to said first chamber by a fourth flow port, to said second chamber by a fifth flow port, and to a vent to atmosphere by a sixth flow port, said valve having a plurality of positions interconnecting said flow passages with said flow ports, said valve in said first position in step (c) connecting said first flow passage with said first flow port and said second flow passage with said fifth flow port, said valve in said second position in step (d) connecting said first flow passage with said third flow port and said second flow passage with said fourth flow port, said valve in said third position in step (e) connecting said first flow passage with said second flow port and said second flow passage with said fourth flow port, and said valve in said fourth position in step (f) connecting said first flow passage with said third flow port and said second flow passage with said fourth flow port.

3. The method of claim 1 wherein said source of feed fluid comprises a source of feed air, and wherein said chambers contain absorbent for selectively absorbing nitrogen from air, and wherein in step (c) air is fed into said first chamber to remove nitrogen therefrom and in step (e) air is fed into said second chamber to remove nitrogen therefrom.

4. The method of claim 1 wherein said valve includes a housing and a rotatable internal plug rotatable having internal passageways to connect said flow passages to selected flow ports, and further including the steps of rotating said drum prior to each of steps (c), (d), (e) and (f) to connect said flow passages to selected flow ports.

5. The method of claim 1 wherein said valve includes a housing, an internal plug rotatable between said positions to connect said flow passages to selected flow ports, and a movable seal between said housing and said internal plug member, and further including the steps of retracting said seal before moving said value to said positions to permit freer movement of said plug between said positions.

6. Apparatus for separating components from a fluid mixture comprising:
a source of feed fluid;
a source of vacuum;
first and second chambers, each chamber containing an absorbent for selectively absorbing a component from said fluid; and
a value operatively connected to said source of feed fluid or said source of vacuum by a first flow passage, to said first chamber by a first flow port, and to said second chamber by a second flow port, said valve having a plurality of positions simultaneously interconnecting said first flow passage to a selected flow port, said valve in a first position adapted to connect said first flow passage and said first flow port to provide a flow passage between said source of fluid or said source of vacuum and said first chamber, said valve in a second position adapted to connect said first flow passage and said second flow port to provide a flow passage between said source of fluid or said source of vacuum and said second chamber, wherein said valve has two valve portions, with a first valve portion being operatively connected to said source of feed fluid and a second valve portion being operatively connected to said source of vacuum, and wherein in said first position said valve simultaneously connects said source of fluid to said first chamber and said source of vacuum to said second chamber and in said second position said valve simultaneously connects said source of fluid to said second chamber and said source of vacuum to said first chamber; and wherein said valve is divided into two valve chambers, one of said valve chambers corresponding to said first valve portion, and the other of said valve chambers corresponding to said second valve portion, each of said valve chambers being independently positionable from the other.

7. The apparatus of claim 6 wherein said valve further includes a third flow port connected to a vent to atmosphere.

8. Apparatus for separating components from a fluid mixture comprising:
a source of feed fluid;
a source of vacuum;
first and second chambers, each chamber containing an absorbent for selectively absorbing a component from said fluid; and
a valve having first and second portions, the first valve portion being operatively connected to said source of feed fluid by a first flow passage, to said first chamber by a first flow port, to said second chamber by a second flow port, and to a vent to atmosphere by a third flow port, the second valve portion being operatively connected to said source of vacuum by a second flow passage, to said first chamber by a fourth flow port, to said second chamber by a fifth flow port, and to a vent to atmosphere by a sixth flow port, said valve having a plurality of positions interconnecting said flow passages with said flow ports, said valve in a first position adapted to connect said first flow passage with said first flow port and said second flow passage with said fifth flow port, said valve in a second position adapted to connect said first flow passage with said third flow port and said second flow passage with said fourth flow port, said valve in a third position adapted to connect said first flow passage with said second flow port and said second flow passage with said fourth flow port, and said valve in a fourth position adapted to connect said first flow passage with said third flow port and said second flow passage with said fourth flow port, wherein said valve is divided into two valve chambers, one of said valve chambers corresponding to said first valve portion, and the other of said valve chambers corresponding to said second valve portion, each of said valve chambers being independently positionable from the other.

9. The apparatus of claim 8 wherein said valve has a housing and said flow ports are disposed on outer peripheral walls of said housing and further including a rotary drum in said valve adapted to connect said flow passages to said flow ports.

10. The apparatus of claim 8 wherein said valve includes a rotary drum and said first and second valve portions are longitudinally spaced along an axis of said drum.

11. The apparatus of claim 8 wherein said valve comprises a rotary valve and said flow ports are disposed on an outer peripheral wall thereof, said valve including an internal plug member rotatable to move between said positions.

12. The apparatus of claim 8 wherein said valve has a housing containing said flow ports disposed on outer peripheral walls of said housing and further including an internal plug member rotatable to move between said positions, said plug member containing openings to connect said flow passages to said flow ports.

13. The apparatus of claim 12 wherein said valve includes a movable seal between said housing and said internal plug member which is retractable to permit freer movement of said plug between said positions.

14. The apparatus of claim 8 wherein said source of feed fluid comprises a source of feed air, and wherein said chambers contain a bed of said absorbent for selectively absorbing nitrogen from air.

15. The apparatus of claim 8, said valve including separate drum portions in said valve chambers rotatable about a longitudinal axis.

* * * * *